United States Patent [19]

Fuwa

[11] Patent Number: 4,783,842
[45] Date of Patent: Nov. 8, 1988

[54] IMAGE READER FOR IMAGE PROCESSING APPARATUS

[75] Inventor: Jyoichi Fuwa, Atsugi, Japan

[73] Assignee: Ricoh Company, Ltd., Tokyo, Japan

[21] Appl. No.: 796,064

[22] Filed: Nov. 8, 1985

[30] Foreign Application Priority Data

Nov. 13, 1984 [JP] Japan ................... 59-237593

[51] Int. Cl.⁴ .......................... G06K 9/20; H04N 3/14
[52] U.S. Cl. ...................... 382/67; 250/578; 358/213.11
[58] Field of Search ............. 382/59, 65, 67; 358/285, 213; 250/578

[56] References Cited

U.S. PATENT DOCUMENTS

| 4,145,721 | 3/1979 | Beaudouin et al. | 250/578 |
| 4,424,590 | 1/1984 | Ozawa | 358/285 |
| 4,495,523 | 1/1985 | Ozawa | 358/213 |
| 4,573,079 | 2/1986 | Yamaguchi | 358/213 |

OTHER PUBLICATIONS

An Introductory to Operational Amplifiers with Linear IC Applications by Luces M. Faulkenberry, pp. 105-107.

Primary Examiner—Leo H. Boudreau
Attorney, Agent, or Firm—Oblon, Fisher, Spivak, McClelland & Maier

[57] ABSTRACT

An image reader for a facsimile apparatus or like image processing apparatus of the type having a line image sensor. A plurality of serial connections of a photodiode and a switch are arranged in an array in the line image sensor and divided into a plurality of discrete blocks by each predetermined number. The output of each of the blocks is applied to an analog adder the output of which is delivered as an image signal. The analog adder replaces switching means adapted for switching actions so as to eliminate switching noise otherwise entailed by the switching actions.

2 Claims, 3 Drawing Sheets

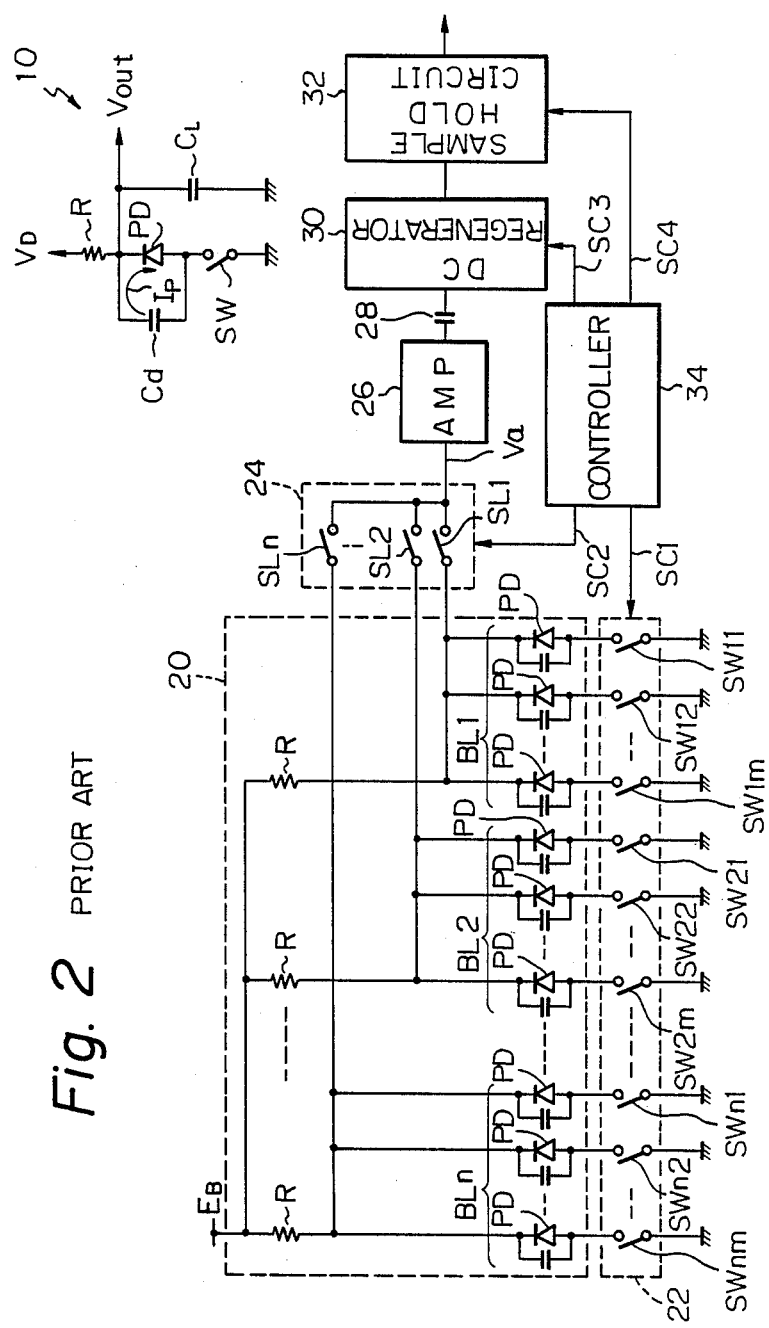

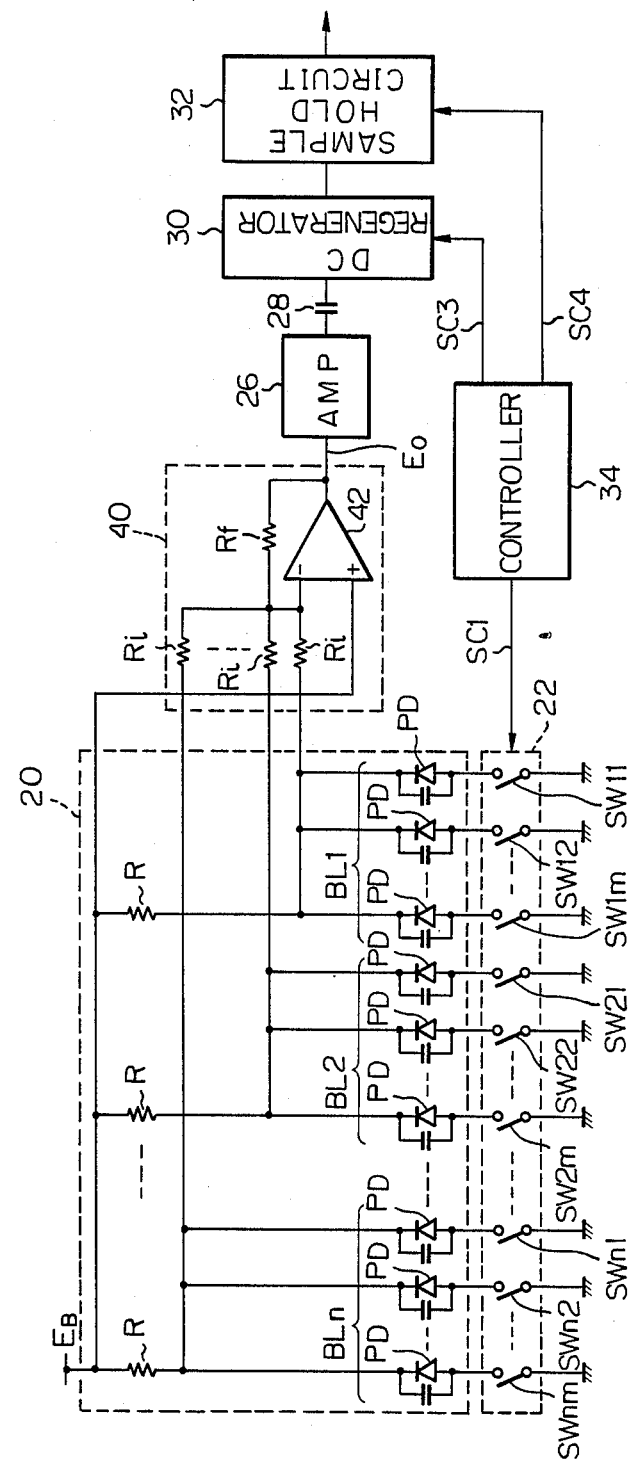

IMAGE READER FOR IMAGE PROCESSING APPARATUS

BACKGROUND OF THE INVENTION

The present invention relates to an image reader for a facsimile apparatus or like image processing apparatus and, more particularly, to an image reader capable of preventing noise from being introduced in signals by use of a store type amorphous silicon line image sensor.

Image reading means heretofore installed in an image processing apparatus is implemented with a line image sensor, as in an image reader section of a facsimile terminal. The line image sensor is constructed and arranged to photoelectrically transduce one line of images on a pixel basis. Generally, a line image sensor comprises a light-sensitive section where a plurality of photoelectric transducer elements such as photodiodes are arranged in an array, and a drive section adapted to sequentially select and deliver output signals of the photoelectric transducer elements. Recently, a so-called store type amorphous silicon line image sensor has been put to practical use which has as its photoelectric transducer elements photodiodes that are made of amorphous silicon. In an image reader of the kind using a store type amorphous silicon line image sensor, since the light-sensitive surface of each photoelectric transducer element can be dimensioned as small as an actual pixel, images on a document need only to be focused in their actual size onto the line image sensor. This advantage leads to a small-size image reader construction.

A basic construction of such a store type amorphous silicon line image sensor is shown in FIG. 1.

In the illustrated image sensor, generally 10, a capacitance Cd represents a coupling capacitance of a photodiode, or photoelectric transducer, PD, while $C_L$ represents a capacitance developing in a wiring between the photodiode PD and a circuit to follow (e.g. amplifier). A resistor R is a current-limiting resistor. A switch SW comprises a MOS (metal oxide semiconductor) switch or like semiconductor element. A voltage $V_D$ is applied to the line image sensor 10 from a power source, not shown.

Assume that the switch SW is turned on to charge the capacitances Cd and $C_L$ and turned off to set up an image signal storing condition. In this condition, a photocurrent Ip complementary to a quantity of received light, i.e., a pixel luminance associated with a read image, develops in the photodiode PD to discharge the capacitance Cd. When the switch SW is turned on again, the photodiode PD produces an output voltage Vout which based on charge conservation is expressed as:

$$V_{out} = V_D - (I_p \cdot T/(C_d + C_L)) \qquad \text{Eq. (1)}$$

where T is the interval between consecutive turnons of the switch SW, or image information storing period).

Meanwhile, in the case where the whole charge stored in the capacitance Cd is discharged by the photocurrent Ip which has flown over the storing time T, the output voltage Vout of the photodiode, or saturation output Vsat, is produced by:

$$V_{sat} = C_L \cdot V_D/(C_L + C_d) \qquad \text{Eq. (2)}$$

Hence, the output Vout of the photodiode PD varies from the source voltage $V_D$ to Vsat complementarily to the photocurrent Ip which has flown over the storing time, i.e. luminance of the associated pixel. In this manner, image signals corresponding to pixel densities are provided.

The store type amorphous silicon line image sensor may be designed to read an A4 format document, which has a reading width of 216 millimeters, eight dots per millimeter by way of example. In this type of image sensor, 1728 photodiodes PD each having a light-sensitive area substantially equal in dimensions to a pixel are arranged at equal intervals in correspondence with the reading width; switches SW are connected in one-to-one correspondence and serially to the photodiodes PD. Where this type of line image sensor is driven as a single element, the capacitance $C_L$ increases to a significant level. The Eq. (2) teaches that an increase in the capacitance $C_L$ is reflected by a decrease in the level of the saturation output Vsat which in turn narrows the available dynamic range.

An implementation heretofore employed to preserve a desirable dynamic range consists in dividing the photoelectric transducer elements of a line image sensor into a plurality of blocks and driving them on a block basis. An example of such a prior art arrangement is shown in FIG. 2 together with a drive section associated therewith.

In FIG. 2, photodiodes PD which constitute a line image sensor 20 are divided into n discrete blocks BL1 to BLn each having m photodiodes. In each of the blocks BL1 to BLn, cathodes of the photodiodes PD are connected to a bias power source $E_B$ via a common resistor R, and anodes to a reference voltage point (ground point in this case) via their associated switches which constitute a switch array 22, i.e. switches SW11 to SW1m, SW21 to SW2m, ..., SWn1 to SWnm. The output of the blocks BL1 to BLn respectively are coupled to selection switches SL1 to SLn which serve in combination as an analog multiplexer 24. The output signal Va of the analog multiplexer 24 is amplified by an amplifier 26, then fed through a capacitor 28 to a DC regenerator circuit 30 for level conversion, then sampled by a sample-hold circuit 32 as image signals which are associated with the individual pixels, and then applied to the next device. A controller 34 prepares control signals SC1 to SC4 adapted to control the operation timings of the switch array 22, analog multiplexer 24, DC regenerator circuit 30 and sample-hold circuit 32, respectively.

In the above construction, one line of image signals are produced by the following procedures. First, the controller 34 produces a control signal SC2 to turn on the selection switch SL1 to thereby select the block BL1 (see waveforms a and b shown in FIG. 3). Simultaneously, the controller 34 produces a control signal SC1, which is a pulse signal having a predetermined period (see waveform e shown in FIG. 3), and applies it to the switch array 22 so as to sequentially turn on the switches SW11 to SL1m of the block BL1 (see waveforms f, g, h and i of FIG. 3). Then, the analog multiplexer 24 produces, at the period of the control signal SC1, signals Va representative of respective pixels associated with the particular block BL1 (see waveform q of FIG. 3).

After the controller 34 has produced m control signals SC1 to fully read the block BL1, it produces a control signal SC2 at the timing of the "m+1" control signals SC1 to turn off the selection switch SL1 and turn on the selection switch SL2 (see waveform c of FIG. 3), thereby selecting the block BL2. Since control signals SC1 are continuously produced, the switches SW21 to SW2m in the switch array 22 are sequentially turned on (see waveforms j, k, l and m of FIG. 3) so that the analog multiplexer 24 delivers signals Va representative of pixels associated with the block BL2 at the period of the control signals SC1.

Thereafter, the controller 34 produces a control signal SC2 at the timing of the "2m+1" control signal SC1 to turn off the selection switch SL2 of the analog multiplexer 24 and turn on the selection switch SL3 (see waveform d of FIG. 3), thereby selecting the block BL3. In this condition, the switches SW31 to SW3m in the switch array 22 are sequentially turned on by the control signals SC1 (see waveforms n, o and p of FIG. 3) with the result that the analog multiplexer 24 delivers signals Va representative of pixels associated with the block BL3 at the period of the control signals SC1.

A procedure similar in principle to the above described one will be repeated to sequentially select the other consecutive blocks BL4 to BLn and, thereby, fully produce one line of image signals Va.

A control signal SC3 is generated at such a timing that a signal level immediately before the appearance of a signal representative of a pixel is sampled by the DC regenerator circuit 30 as a reference level for level conversion. A control signal SC4 on the other hand is generated with a predetermined delay relative to the control signal SC1.

The problem with the prior art arrangement as discussed above is that every time the analog multiplexer 24 switches the blocks BL1 to BLn from one to another, switching noise NZ due to the operation of any of the switches SL1 to SLn is superposed on the image signal Va, as shown in the waveform q of FIG. 3. The switching noise NZ degrades the signal-to-noise (S/N) ratio of the image signals Va and, thereby, reproduced images.

SUMMARY OF THE INVENTION

It is therefore an object of the present invention to provide an image reader for an image processing apparatus which increases the S/N ratio of image signals and, thereby, enhances high quality image reproduction.

It is another object of the present invention to provide a generally improved image reader for an image processing apparatus.

An image reader for an image processing apparatus which photoelectrically transduces one line of images on a pixel basis of the present invention includes a plurality of photoelectric transducers which are arranged in an array in a line image sensor. The photoelectric transducers are divided into a plurality of discrete blocks by each predetermined number in the order of arrangement. The photoelectric transducers in each of the blocks have output terminals which are commonly connected. An analog adder has input terminals to which outputs of the discrete blocks are connected in one-to-one correspondence. Outputs of the analog adder are delivered as image signals associated with the images.

In accordance with the present invention, an image reader for a facsimile apparatus or like image processing apparatus of the type having a line image sensor is disclosed. A plurality of serial connections of a photodiode and a switch are arranged in an array in the line image sensor and divided into a plurality of blocks by each predetermined number. The output of each of the blocks is applied to an analog adder the output of which is delivered as an image signal. The analog adder replaces switching means adapted for switching actions so as to eliminate switching noise otherwise entailed by the switching actions.

The above and other objects, features and advantages of the present invention will become more apparent from the following detailed description taken with the accompanying drawings.

BRIEF DESCRIPTION OF THE DRAWINGS

FIG. 1 shows an equivalent circuit which is representative of a basic construction of a store type amorphous silicon image sensor;

FIG. 2 is a block diagram of a prior art image reader;

FIG. 4 is a block diagram of an image reader embodying the present invention.

DESCRIPTION OF THE PREFERRED EMBODIMENT

Figure 3:
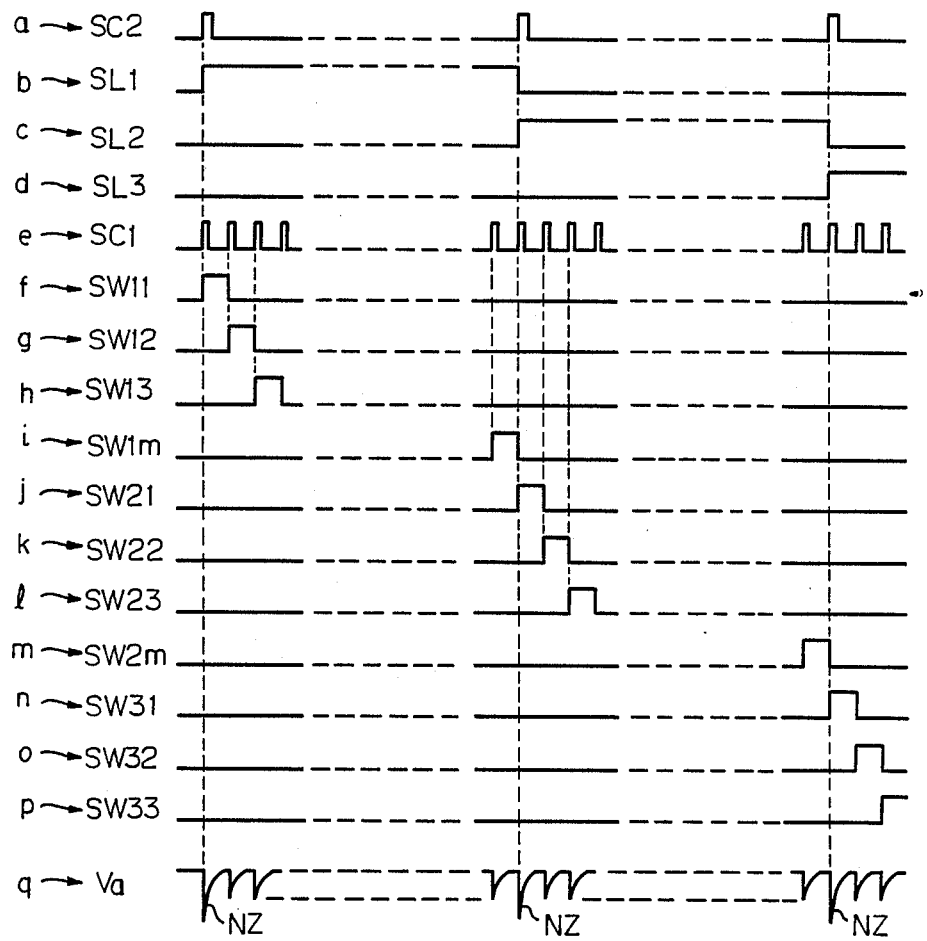
FIG. 3 shows waveforms demonstrating the operation of the image reader shown in FIG. 2.

While the image reader for an image processing apparatus of the present invention is susceptible of numerous physical embodiments, depending upon the environment and requirements of use, a substantial number of the herein shown and described embodiment have been made, tested and used, and all have performed in an eminently satisfactory manner.

Referring to FIG. 4, an image reader in accordance with the present invention is shown. In FIG. 4, the same or similar structural elements as those shown in FIG. 2 are designated by like reference numerals and will not be described in detail.

As shown, the image reader includes an additive amplifier 40 which is made up of an operational amplifier (OP AMP) 42, n input resistors Ri, and a feedback resistor Rf. Output signals associated with blocks BL1 to BLn of a line image sensor 20 are applied to the input resistors Ri, respectively. The noninverting input of the OP AMP 42 is connected to a bias power source $E_B$. Assuming that the outputs of the blocks BL1 to BLn are E1 to En, respectively, then the output Eo of the additive amplifier 40 is expressed as:

$$Eo = -(Rf/Ri)((E1-E_B)+(E2-E_B)+ \ldots +(En-E_B)) \qquad \text{Eq. (3)}$$

In the above construction, since the photodiodes PD in the line image sensor 20 are energized one at a time, all the output signals except for the output signal of any of the blocks BL1 to BLn which contains the particular photodiode PD which is turned on are equal to the bias power source $E_B$. Hence, while image signals are read out of the block BL1 by way of example, all the terms of the Eq. (3) which are associated with the other blocks BL2 to BLn, i.e., those which contain E2 to En are zero. Then, the Eq. (3) is rewritten as:

$$Eo = (Rf/Ri) \cdot \Delta e \qquad \text{Eq. (4)}$$

where $\Delta e$ is a component of a signal read out and is expressed as $\Delta e = E_B - E1$.

In this manner, a signal associated with a particular pixel which is being read out appears at the output of the additive amplifier 40. Such allows outputs of the discrete blocks BL1 to BLn to be read out without resorting to the analog multiplexer 24 of the prior art, which is made up of the selection switches SL1 to SLn. Therefore, switching noise which would degrade the S/N ratio is prevented from being introduced in the image signals.

The additive amplifier 40 shown and described may be replaced with a mixing circuit, if desired.

In summary, it will be seen that the present invention provides an image reader for an image processing circuit which fees image signals from switching noise and, thereby, decrease in S/N ratio. This advantage is derived from the unique construction in which outputs of respective photoelectric transducer blocks are coupled to an additive amplifier, or analog adder, the outputs of which serve as image signals, that is, image signals are read out without the need for selecting outputs of the blocks using selection switches which constitute an analog multiplexer.

Various modifications will become possible for those skilled in the art after receiving the teachings of the present disclosure without departing from the scope thereof.

What is claimed is:

1. An image reader for an image processing apparatus which photoelectrically transduces one line of images on a pixel basis, comprising:
    a plurality of photoelectric transducer means arranged in an array in a line image sensor, said photoelectric transducer means being divided into a plurality of discreet blocks by a predetermined number in the order of arrangement, the photoelectric transducer means in each of said blocks having output terminals which are commonly connected;
    analog adder means having input terminals to which outputs of said discreet blocks are connected in a one-to-one correspondence, outputs of said analog adder means being delivered as image signals associated with said transduce image;
    means for selecting said photoelectric transducer means; and
    wherein said analog adder means comprises an operational amplifier having an inverting input terminal and a non-inverting input terminal, a plurality of input resistors to one terminal of which the outputs of said discreet blocks applied, respectively, and the other terminals of which are commonly connected to the inverting input terminal of said operational amplifier, and a feedback resistor for feeding back an output of the operational amplifier to the inverting input terminal, the non-inverting input terminal of the operational amplifier being applied with a bias voltage; and
    wherein said bias voltage cancels any signal produced by the non-selected phototransducer means.

2. An image reader as claimed in claim 1, wherein each of the photoelectric transducer means comprises a serial connection of a photodiode and a switch, an output of the block to which said serial connection belongs being applied via the input resistor to the inverting input terminal of the operational amplifier of the analog adder means.

* * * * *